US007736224B2

(12) United States Patent
Aida

(10) Patent No.: US 7,736,224 B2
(45) Date of Patent: Jun. 15, 2010

(54) GAMING MACHINE AND METHOD OF CONTROLLING THE SAME

(75) Inventor: Eiji Aida, Tokyo (JP)

(73) Assignee: Konami Gaming Incorporated, Las Vegas ( * ) Notice: Subject to any disclaimer, the term of this patent is extended or adjusted under 35 U.S.C. 154(b) by 690 days.

(21) Appl. No.: 10/401,592

(22) Filed: Mar. 31, 2003

(65) Prior Publication Data

US 2004/0038727 A1 Feb. 26, 2004

(30) Foreign Application Priority Data

Aug. 20, 2002 (JP) .......................... P2002-239852

(51) Int. Cl.
*A63F 9/24* (2006.01)
*A63F 13/00* (2006.01)

(52) U.S. Cl. ............................ 463/20; 463/16; 463/25; 463/29

(58) Field of Classification Search .................. 463/19, 463/20, 1, 9, 16, 25, 29, 40–42; 273/138.1–2, 273/143 R
See application file for complete search history.

(56) References Cited

U.S. PATENT DOCUMENTS

| | | | | |
|---|---|---|---|---|
| 4,661,906 | A * | 4/1987 | DiFrancesco et al. | 463/19 |
| 5,580,053 | A | 12/1996 | Crouch | |
| 5,595,538 | A * | 1/1997 | Haste, III | 463/17 |
| 5,609,524 | A * | 3/1997 | Inoue | 463/20 |
| 5,769,415 | A * | 6/1998 | Yamazaki et al. | 273/108 |
| 5,782,471 | A * | 7/1998 | Bautista et al. | 273/256 |
| 5,833,537 | A * | 11/1998 | Barrie | 463/21 |
| 5,971,849 | A * | 10/1999 | Falciglia | 463/16 |
| 5,980,384 | A * | 11/1999 | Barrie | 463/16 |
| 6,093,102 | A * | 7/2000 | Bennett | 463/20 |
| 6,220,959 | B1 * | 4/2001 | Holmes et al. | 463/13 |
| 6,251,013 | B1 * | 6/2001 | Bennett | 463/13 |
| 6,257,980 | B1 * | 7/2001 | Santini, Jr. | 463/19 |
| 6,336,860 | B1 | 1/2002 | Webb | |
| 6,471,208 | B2 * | 10/2002 | Yoseloff et al. | 273/143 R |
| 6,604,740 | B1 * | 8/2003 | Singer et al. | 273/292 |
| 6,604,999 | B2 * | 8/2003 | Ainsworth | 463/20 |
| 6,648,758 | B2 * | 11/2003 | Bennett et al. | 463/20 |
| 6,699,122 | B1 * | 3/2004 | Osawa | 463/20 |
| 6,729,618 | B1 * | 5/2004 | Koenig et al. | 273/138.2 |
| 6,857,958 | B2 * | 2/2005 | Osawa | 463/20 |
| 6,869,357 | B2 * | 3/2005 | Adams et al. | 463/16 |

FOREIGN PATENT DOCUMENTS

| | | |
|---|---|---|
| JP | 04-364871 | 12/1992 |
| JP | 6-246043 | 9/1994 |
| JP | 3056308 | 11/1998 |
| JP | 3062079 | 6/1999 |
| JP | 11-309257 | 9/1999 |
| JP | 2001-170254 | 6/2001 |
| JP | 2002-186704 | 7/2002 |
| WO | WO 96/08799 A1 | 3/1996 |
| WO | WO 97/32286 A1 | 9/1997 |

* cited by examiner

*Primary Examiner*—John M Hotaling, II
*Assistant Examiner*—Ryan Hsu
(74) *Attorney, Agent, or Firm*—Masuvalley & Partners

(57) ABSTRACT

A display includes a plurality of matrix areas. Each of the areas is operable to display one of plural indicias. A controller determines an occurrence of a win when predetermined indicias are stationarily arranged in the display so as to form a predetermined relative positional relationship at anywhere in the matrix areas.

19 Claims, 12 Drawing Sheets

GAMING MACHINE AND METHOD OF CONTROLLING THE SAME

BACKGROUND OF THE INVENTION

The invention relates to a gaming machine, such as a skilled-stop type gaming machine, or a slot machine, and more particularly, to a gaming machine characterized in determination of occurrence of a win.

There has hitherto been known a gaming machine having a display in which area to be used for displaying a plurality of types of indicias (hereinafter, simply referred to as indicias) are arranged in a matrix pattern, wherein, when predetermined indicias are displayed as a predetermined combination in the display along, e.g., a horizontal line or a diagonal line, the gaming machine enters a status which is advantageous to a player.

The gaming machine of this type determines whether to enter a status advantageous to the player in consideration of two viewpoints: that is, "occurrence of a combination of predetermined symbols" and "positions where the predetermined symbols are stationarily displayed," in connection with a certain symbol acting as the indicia.

More specifically, a symbol-variable gaming machine (first related art) described in, e.g., Japanese Utility Model No. 3062079, effects setting of "positions where the predetermined symbols are stationarily displayed," wherein predetermined winning lines have been set beforehand, and one end of each of the winning lines is bent in a slanting direction.

A slot machine described in Japanese Utility Model No. 3056308 (second related art) is directed toward easing the "positions where the predetermined symbols are stationarily displayed" such that an "occurrence of a combination of predetermined symbols" is established so long as identical symbols appear on respective reels, thereby achieving a win regardless of the winning line. A gaming characteristic; that is, the player's expectation, is enhanced by increasing the chance of occurrence of a winning pattern.

As mentioned above, various improvements have been made in order to enhance the gaming characteristic for the player. According to the above-described first related art, a restriction in which predetermined winning lines have been set beforehand has contributed to an increase in the number of winning lines. In the meantime, the player encounters inconvenience of having to memorize winning patterns. Particularly, in the case of a large number of winning lines (BET lines) (6 to 30 lines), the player cannot memorize all the lines. Further, the player also encounters difficulty in intuitively ascertaining, within a short period of time, whether or not a win has arisen. Therefore, complexity of these BET lines is likely to result in a problem of arousing a feeling of repulsion in a player who is playing the game for the first time or a problem of the player being unable to understand the condition and being bewildered.

According to the second related art, the player does not need to memorize the BET lines such as those employed in the first related art; the only requirement is to display the same symbols anywhere on each of the respective reels. When identical symbols are displayed in spaced display regions, the player encounters greater difficulty in intuitively ascertaining, within a short period of time, whether or not a win has arisen, to a degree corresponding to the distance between the symbols. The larger the number of reels, the greater the difficulty. Under the condition that identical symbols must appear on all reels, the player's pleasure is spoiled if the symbol has failed to appear at one display area. Hence, such a condition forms a barrier to further enhancement of the gaming characteristic.

SUMMARY OF THE INVENTION

It is therefore an object of the invention to provide a gaming machine which reduces complexity in ascertaining occurrence of a win along a BET line, which enables visual and intuitive ascertainment of a game rule, and which is easy for a beginner or a casual player to understand.

In order to achieve the above object, according to the invention, there is provided a gaming machine, comprising:

a display, including a plurality of matrix areas, each operable to display one of plural indicias; and a controller, which determines an occurrence of a win when predetermined indicias are stationarily arranged in the display so as to form a predetermined relative positional relationship at anywhere in the areas.

In such a configuration, if only when predetermined indicias are stationarily arranged in the display so as to form a predetermined relative positional relationship at anywhere in the areas the game shifts to a state advantageous to the player; that is, a state in which a predetermined number of tokens are paid and processing proceeds to a bonus game.

In the related art, a winning line has hitherto been determined beforehand. When identical indicias are stationarily displayed along the winning line, a determination is made as to whether or not a win has arisen. According to the invention, the relative positional relationship induce occurrence of a win when displayed not at absolute positions (i.e., fixed positions in the matrix areas), but anywhere in the matrix areas. A stationary display pattern for a win which has not been available thus far is provided, thereby improving a gaming characteristic.

Furthermore, there is no necessity for the player to ascertain winning lines before playing a game, as in the case of a related-art gaming machine. As a result, complexity of a condition for offering a gaming value can be reduced.

Preferably, the relative positional relationship is formed when the predetermined indicias are adjacently arranged in at least one of a row direction, a column direction and a diagonal direction in the matrix areas.

In such a configuration, a stationary display pattern for a win which has never been available thus far can be provided, thereby improving a gaming characteristic.

Preferably, the relative positional relationship is formed when the predetermined indicias are adjacently arranged in at least one of a row direction and a diagonal direction in the matrix areas.

In such a configuration, the winning combination may be more simplified so that the player easily recognize his/her win.

The above configurations may be expressed that the occurrence of a win is determined when indicias stationarily displayed in adjacent areas are the predetermined indicias.

Here, it is preferable that each of at least three column in the matrix area contains only one of the predetermined indicias when three or more predetermined indicias are adjacently arranged.

In a situation where a closed polygon is formed when the three or more identical indicias are adjacently arranged, the above configuration may be used for clarifying the nature of an arrangement pattern to be set as a winning pattern or an indicia which is to be used as a start point for determining occurrence of a win.

Preferably, the controller determines the number of win only considering the number of the positional relationship formed in the matrix area.

In such a configuration, the complexity involved in determining a winning pattern or rendering a determination can be obviated by setting the number of independent lines formed when indicias remaining in a predetermined symbol relationship are linked together, regardless of the indicias.

Preferably, the indicias includes an indicia substituting any other indicias.

Such an indicia may be a so-called wild card. As a result of this indicia being stationarily displayed, in effect, identical information items are adjacent to each other, thereby enhancing the gaming characteristic further.

According to the invention, there is also provided a method of controlling a gaming machine, comprising steps of:

providing a plurality of matrix areas in a display such that each of the areas is operable to display one of plural indicias; and determining an occurrence of a win when predetermined indicias are stationarily arranged in the display so as to form a predetermined relative positional relationship at anywhere in the areas.

Preferably, the relative positional relationship is formed when the predetermined indicias are adjacently arranged in at least one of a row direction, a column direction and a diagonal direction in the matrix areas.

Preferably, the relative positional relationship is formed when the predetermined indicias are adjacently arranged in at least one of a row direction and a diagonal direction in the matrix areas.

Here, it is preferable that each of at least three column in the matrix area contains only one of the predetermined indicias when three or more predetermined indicias are adjacently arranged.

Preferably, the controller determines the number of win only considering the number of the positional relationship formed in the matrix area.

Preferably, the indicias includes an indicia substituting any other indicias.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

One embodiment of the invention will be described hereinbelow by reference to the accompanying drawings. The invention will now be described by use of a slot machine as an example of a gaming machine. However, the invention is not limited to the slot machine. The invention can be applied to all gaming machines, so long as the gaming machine has a display where a plurality of kinds of indicias, which are variably displayed and can be stationarily displayed in respective display areas at predetermined timings, are to be displayed, as in the case of a skilled-stop type gaming machine or the like.

Figure 1:
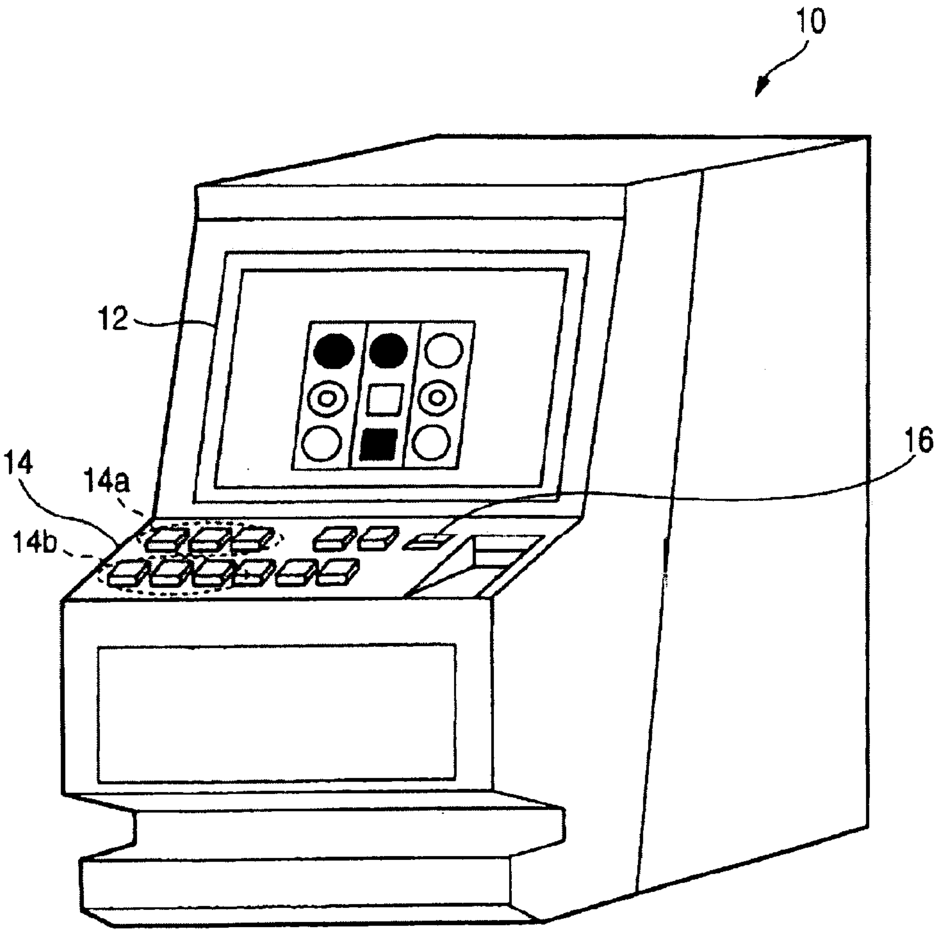
FIG. 1 is a view showing the external configuration of a gaming machine according to an embodiment of the invention.

A slot machine 10 shown in FIG. 1 is roughly constituted of a control panel 14 by way of which a player operates a game status, and a display 12 which displays the game status. A game is started as a result of the player inserting tokens into a token insertion slot 16 provided on the right side of the control panel 14.

Figure 5A:
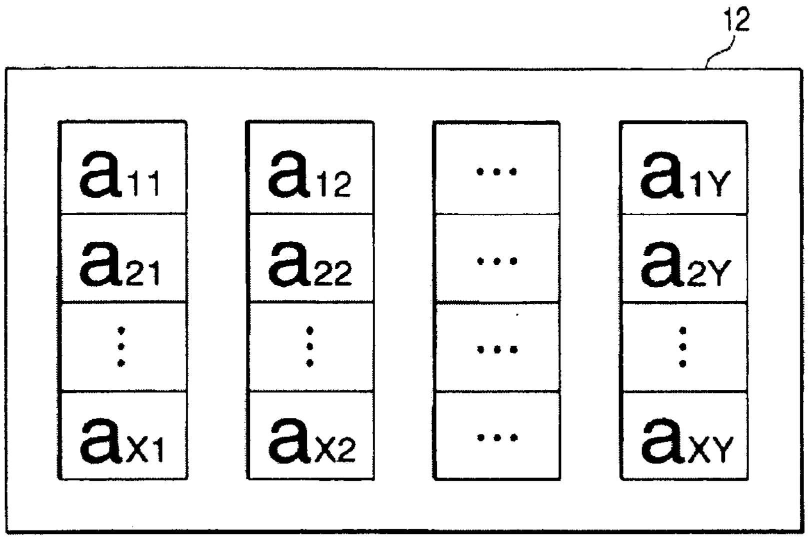
FIG. 5A is a diagram showing areas where indicias are to be displayed.

A plurality of areas to be used for displaying a plurality of indicias, such as "$a_{11}$," "$a_{12}$," "$a_{1Y}$," . . . , "$a_{XY}$," are provided in the display 12 (see FIG. 5A). Within the plurality of areas arranged into a matrix pattern, each of rows constitutes a single reel (i.e., a video reel).

Throughout the specification, the term "ID information" denotes information that is visually discernible, such as characters, symbols, pictures, or patterns (i.e., symbols).

Specifically, a first reel comprising "$a_{11}$," "$a_{12}$," . . . , "$a_{X1}$"; a second reel comprising "$a_{12}$," "$a_{22}$," . . . , "$a_{X2}$"; . . . , and a Y-th reel "$a_{1Y}$," "$a_{2Y}$," . . . , "$a_{XY}$" are displayed on the display 12.

In the following description, a matrix display is employed unless otherwise specified. The matrix display shows respective areas. In relation to codes to be attached to the matrix, the code is not limited solely to "a." Other codes "b" or "c" may also be used, as required.

The areas may be areas which are not definitely partitioned into a matrix pattern but which can be presumed as being formed from a plurality of areas as a result of indicias being displayed in the areas. The areas assume any physical pattern.

After lapse of a predetermined period of time since spinning of the respective reels was displayed (variable display), the gaming machine 10 of the embodiment stops the reels displayed on the display 12 by automatic control of the gaming machine, thereby stationarily displaying indicias in the respective areas (stationary display).

In a gaming machine which enables the player to stop the respective reels through operation, stop buttons 14*a* to be used for stopping and stationarily displaying indicias are provided in the control panel 14 of the slot machine shown in FIG. 1. Here, left, center, and right buttons of the stop buttons 14*a* are provided to be used for controlling stationary display of the first reel (left reel), the second reel (center reel), and the third reel (right reel) displayed on the display 12.

Here, the expression "variable display" is a concept encompassing one or all of situations; namely, a situation in which an indicia is sequentially changed from, e.g., symbol "1" corresponding to one indicia to symbol "2" corresponding to another indicia; a situation in which a symbol "5" is changed to another symbol "☆" and the symbol "☆" is then displayed; and a situation in which one indicia is shifted while being displayed in a variable display device capable of displaying ID information, e.g., a case where one symbol "7" is moved while being displayed in an area.

The concept further encompasses a case where a display pattern of an indicia is changed; for example, where one symbol "7" is deformed and displayed in a horizontally-expanded or vertically-expanded form, or where a symbol is displayed in an enlarged manner or a reduced manner.

The expression "stationary display" is a display pattern for displaying a certain indicia after having stopped it at a predetermined position.

The control panel 14 of the slot machine 10 is provided with BET buttons 14*b* to be used for selecting a BET range, thereby selecting a BET range to be validated. A relationship between the BET range and determination of occurrence of a win made by the gaming machine will be described later.

Figure 2:
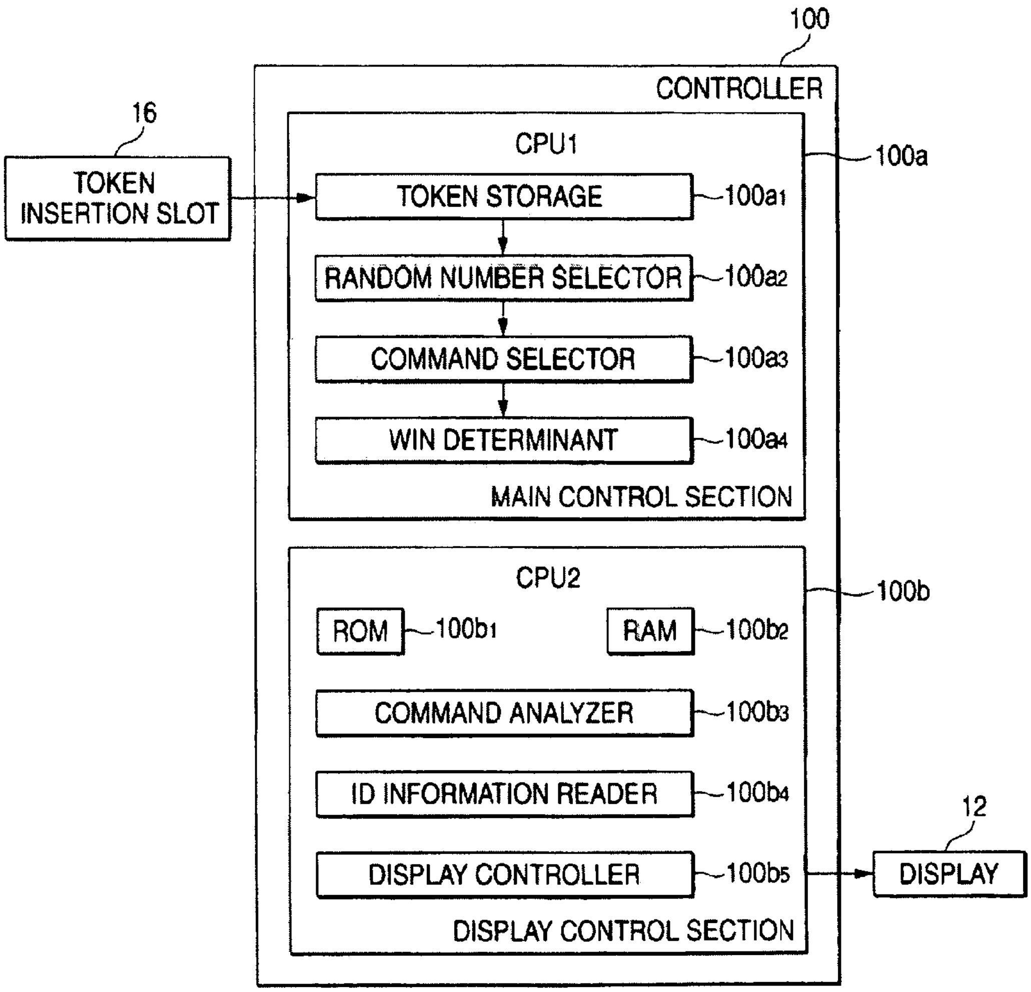
FIG. 2 is a block diagram showing hardware configuration of the gaming machine.

As shown in FIG. 2, a controller 100 of the slot machine 10 comprises a main control section 100*a* for determining occurrence of a win, and a display control section 100*b* for controlling display operation of the display 12.

First, the main control section 100*a* comprises a token storage $\mathbf{100}a_1$ which detects tokens inserted through the token inlet slot 16 and stores the detected tokens; a random number selector $\mathbf{100}a_2$ for effecting an internal lottery of a game status when a game is started by betted tokens; a command selector $\mathbf{100}a_3$ which outputs a command signal showing a game status in accordance with a signal output from the random number selector $\mathbf{100}a_2$; and a win determinant $\mathbf{100}a_4$ which determines occurrence of a win in accordance with the command signal output from the command selector $\mathbf{100}a_3$.

In addition to the detection of the tokens inserted by way of the token insertion slot 16 and stores the thus-inserted tokens, the token storage 100*a*1 also stores the remaining number of tokens by subtracting the number of tokens bet from the number of tokens inserted. In accordance with the information stored in the token storage $\mathbf{100}a_1$, the number of tokens owned by the player can also be displayed.

When a game is started, the random number selector $\mathbf{100}a_2$ performs an internal lottery of a game status by selecting one from previously-stored random numbers. One random number is selected, and the thus-selected numerical value is output to the command selector $\mathbf{100}a_3$.

The command selector $\mathbf{100}a_3$ selects one of commands which are set in association with respective selected numerical values. On the basis of the random number (numerical value) selected by the random number selector $\mathbf{100}a_2$, a pattern of ID information is stationarily displayed in the display 12. The command selector $\mathbf{100}a_3$ outputs the thus-selected command signal to the win determinant $\mathbf{100}a_4$.

In accordance with the command signal determined by the command selector $\mathbf{100}a_3$, the win determinant $\mathbf{100}a_4$ determines occurrence of a win. Specifically, in connection with the plurality of indicias stationarily displayed in the display 12, a determination is made as to whether or not a relative positional relationship between the indicias is identical with a predetermined pattern; for example, whether or not identical information items are adjacent to each other. If this requirement is satisfied, occurrence of a win is determined on the basis of the relationship. A specific way in which the win determinant $\mathbf{100}a_4$ determines occurrence of a win will be described later.

The display control section 100*b* comprises a ROM $\mathbf{100}b_1$; a RAM $\mathbf{100}b_2$; a command analyzer $\mathbf{100}b_3$; an ID information reader $\mathbf{100}b_4$; and a display controller $\mathbf{100}b_5$.

Here, stored in the ROM $\mathbf{100}b_1$ are a display control program for performing variable and stationary display of ID information, and image data pertaining to all indicias required for running the display control program. Image data pertaining to all ID information images stored in the ROM $\mathbf{100}b_1$ are read and stored in the RAM $\mathbf{100}b_2$ at the time of activation (resetting) of the slot machine 10.

The command analyzer $\mathbf{100}b_3$ receives a command signal output from the command selector $\mathbf{100}a_3$ and decodes the signal. On the basis of the decoding (analyzing) operation, a corresponding display control program is read from the ROM $\mathbf{100}b_1$.

The main control section 100*a* and the display control section 100*b*, which controls display operation of the display, are electrically connected together, thereby exchanging a signal. Specifically, the ID information read from the RAM $\mathbf{100}b_2$ is read by the ID information reader $\mathbf{100}b_4$in accordance with contents of a display control program, as required. A display controller $\mathbf{100}b_5$ variably displays the thus-read ID information on the display 12 in accordance with contents of a display control program. Identification information matching the ID information specified by the command selector $\mathbf{100}a_3$ is stationarily displayed.

Figure 3:
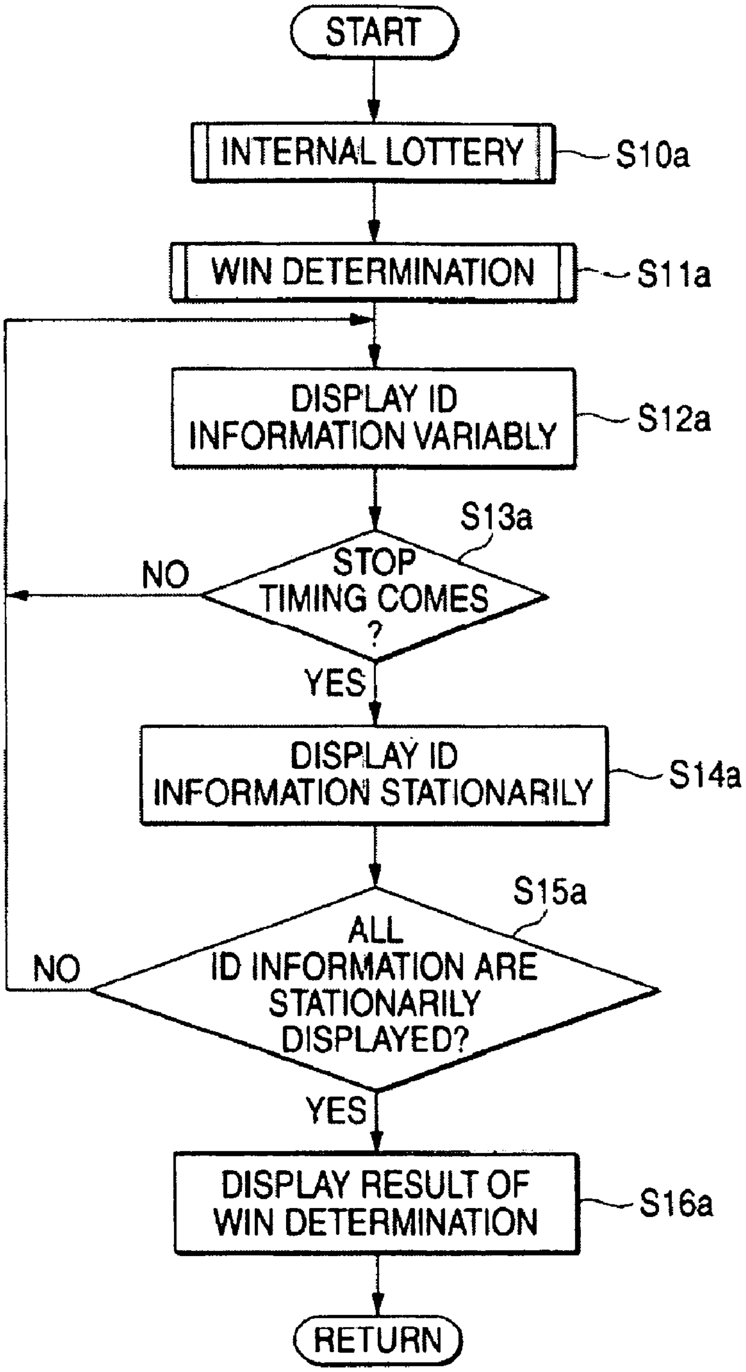
FIG. 3 is a flowchart showing game processing routine of the gaming machine.

As shown in FIG. 3, according to the game processing routine of the gaming machine 10, internal lottery operation is performed when the player has completed inputting the number of tokens (step S10*a*). Here, the internal lottery operation is for selecting random numerical values at given intervals from random number sequences produced by a random number generator provided in the random number selector $\mathbf{100}a_2$, and for comparing the thus-selected numerical values with predetermined data stored in the ROM $\mathbf{100}b_1$, thereby determining the ID information to be stationarily displayed on the display 12. The indicias to be stationarily displayed constitutes stationary display patterns.

On the basis of the thus-identified indicias, the win determinant $\mathbf{100}a_4$ performs win determination processing (step S11*a*). A determination is made as to whether or not a win has arisen. If a win is determined to have arisen, a pattern of the win (i.e., a pattern which can provide the player with an advantage, such as the number of tokens to be paid) is determined. The win determination processing is determined in accordance with the win determination processing routine to be described later.

Next, variable display of the indicias is performed (step S12*a*). Processing pertaining to this step is iterated until all the indicias are determined to have been stationarily displayed in step S15*a*.

After the indicias have been variably displayed, a determination is made as to whether or not the indicias are to be stationarily displayed, on the basis of actuation of the stop buttons 14*a* performed by the player or lapse of a predetermined period of time (step S13*a*).

When the indicias are determined to be stationarily displayed, the indicia is stationarily displayed on a per-reel basis (step S14*a*). Stationary display of the ID information is performed on the basis of details of flags set through the internal lottery performed in step S10*a*. If the indicias are determined not to be stationarily displayed in step S13*a*, processing returns to step S12*a*, wherein variable display of the ID information is continued.

In step S14*a*, the indicias of the respective reels are stationarily displayed, and a determination is made as to whether or not all the indicias are stationarily displayed (step S15*a*).

When all the indicias are determined to have been stationarily displayed, a result of determination of occurrence of a win is displayed on the basis of the result of win determination processing pertaining to S11*a* (step S16*a*). In contrast, if not all the indicias are determined to have been stationarily displayed in step S15*a*, processing returns to S12*a*, thereby sequentially, stationarily displaying the indicias that are being variably displayed.

As a result of completion of the win determination processing performed in step S16*a*, a result of the win determination operation is reflected on the gaming machine, whereupon a shift to a state which can be advantageous to the player is effected.

By reference to FIG. 3, the game processing routine for the gaming machine has been described, wherein a stationary display pattern for indicias has already been determined through the internal lottery operation before the ID information to be displayed in the areas is variably displayed (step S10*a*). In the gaming machine in which indicias are stationarily displayed in a predetermined stationary display pattern at all times, a determination is made as to whether or not a win has arisen at a point in time at which the stationary display pattern is determined (step S11*a*). The win information is held, and occurrence of the win is determined simultaneously with stationary display of the indicias on all regions, thereby displaying the result of win determination processing (step S16*a*).

Figure 4:
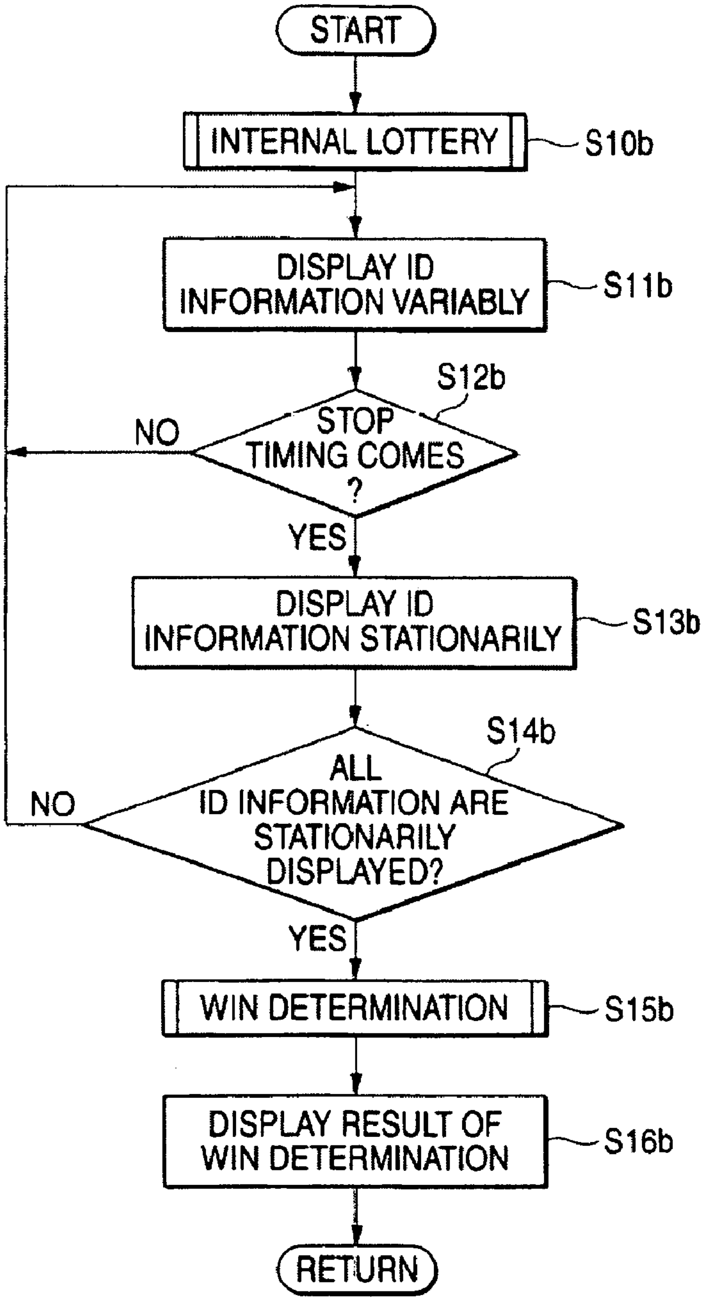
FIG. 4 is a flowchart showing another example of gaming processing routine of the gaming machine.

On the other hand, FIG. 4 shows a game processing routine for a gaming machine which sometimes stationarily displays the indicias in a pattern different from the predetermined stationary display pattern. Occurrence of a win is determined (step S15*b*) after the indicias have been stationarily displayed in all the areas (step S14*b*). A result of determination of a win is displayed (step S16*b*). This game processing routine S10*b* through S16*b* is substantially identical in configuration with the game processing routine shown in FIG. 3.

Processing for determining a win determination processing according to the embodiment of the invention will now be described.

The win determination processing of the invention is performed in S11*a* shown in FIG. 3 or S15*b* shown in FIG. 4. Here, the win determination processing is performed by determining whether or not a match exists between a stationary display pattern determined through internal lottery operation and a predetermined pattern. Here, the predetermined pattern corresponds to a pattern into which a relative positional relationship between indicias, the items constituting a predetermined symbol relationship, is determined. The predetermined pattern is stored in the ROM 100*b*$_1$.

The expression "predetermined symbol relationship" means a relationship between details (i.e., symbols) of the indicias to be displayed. This relationship applies to indicias having identical details to be displayed, as well as to indicias whose details (symbols) to be displayed differ but which can be intuitively perceived to be relevant to each other.

Figure 5B:
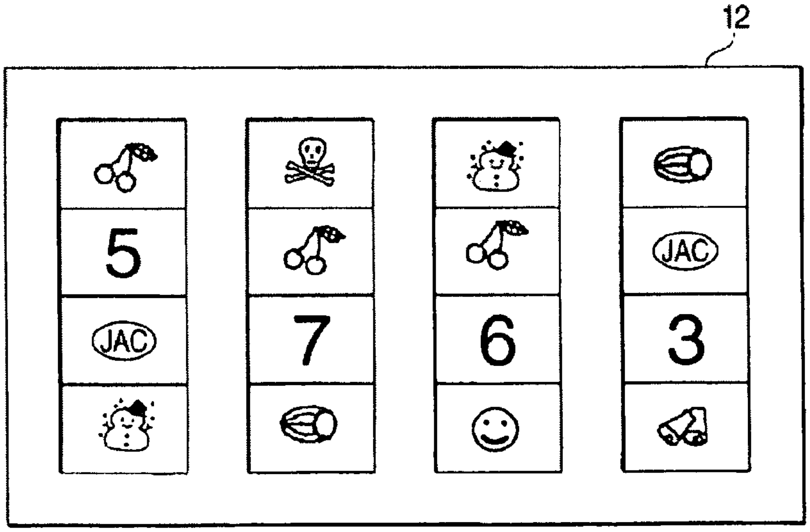
FIG. 5B is a diagram showing an example actual indicias are displayed.

More specifically, as shown in FIG. 5B, ID information "CHERRY" is assumed to appear in the area "$a_{11}$"; ID information "SKULL AND CROSSBONES" is assumed to appear in the area "$a_{12}$"; ID information "SNOWMAN" is assumed to appear in the area "$a_{13}$"; ID information "WATERMELON" is assumed to appear in the area "$a_{14}$"; ID information "5" is assumed to appear in the area "$a_{21}$"; the ID information "CHERRY" is assumed to appear in the area "$a_{22}$"; the ID information "CHERRY" is assumed to appear in the area "$a_{23}$"; ID information "JAC" is assumed to appear in the area "$a_{24}$"; the ID information "JAC" is assumed to appear in the area "$a_{31}$"; ID information "7" is assumed to appear in the area "$a_{32}$"; ID information "6" is assumed to appear in the area "$a_{33}$"; ID information "3" is assumed to appear in the area "$a_{34}$"; the ID information "SNOWMAN" is assumed to appear in the area "$a_{41}$"; the ID information "WATERMELON" is assumed to appear in the area "$a_{42}$"; ID information "SMILEY FACE" is assumed to appear in the area "$a_{43}$"; and ID information "BELL" is assumed to appear in the area "$a_{44}$."

"CHERRY" and "WATERMELON" differ in nature from each other but can be perceived to be relevant to each other in that they are both foods. Therefore, CHERRY and WATERMELON can be said to have a "predetermined symbol relationship." Similarly, "SNOWMAN," "SMILEY FACE," and "SKULL AND CROSSBONES" can be perceived to be relevant to each other in that they are some types of characters. As mentioned above, animals, characters, fruits, numerals, and others are displayed, thereby enabling setting of a variety of combinations of indicias. Thus, there can be provided a gaming machine rich in gaming characteristic.

The expression "relative positional relationship" means a relative positional relationship between indicias which can be visually, intuitively ascertained by the player. For example, the relative positional relationship includes a arrangement in which indicias are arranged side by side; a arrangement in which indicias are arranged alternately; a large V-shaped arrangement; and a knightly arrangement.

Figure 6A:
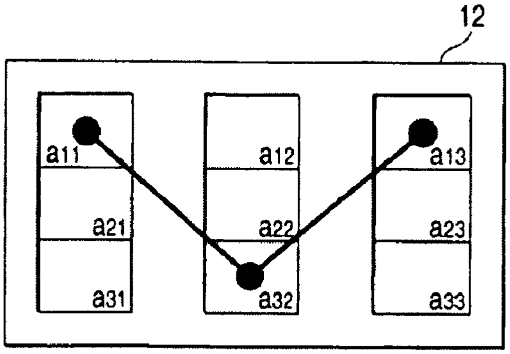
FIGS. 6A to 6D are diagrams showing modes of stationary display of indicias.
Figure 6B:
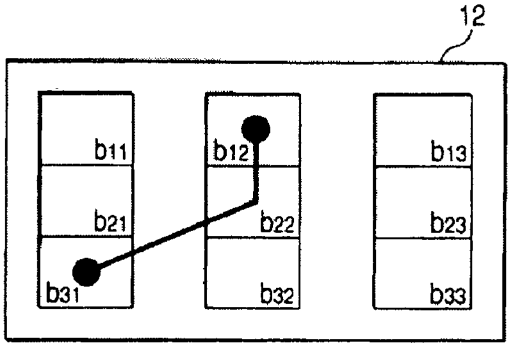

Relative arrangements which are easily visible for the player, such as the "large V-shaped arrangement" represented by an arrangement relationship which is shown in FIG. 6A and consists of $c_{11}$-$c_{32}$-$c_{13}$ and the "knightly arrangement" represented by the arrangement relationship which is shown in FIG. 6B and consists of $b_{31}$ and $b_{12}$, are set as "predetermined patterns." When such a relative arrangement has been achieved, occurrence of a win is determined. As a result, the player can intuitively ascertain, within a short period of time, whether or not a win has arisen.

Figure 6C:
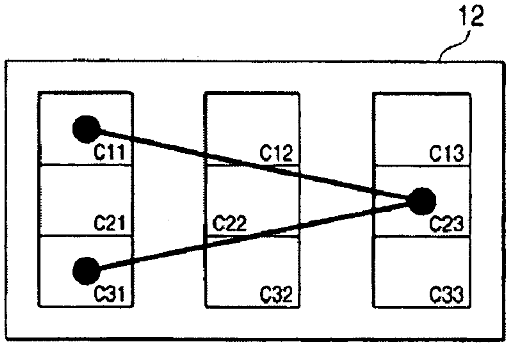
Figure 6D:
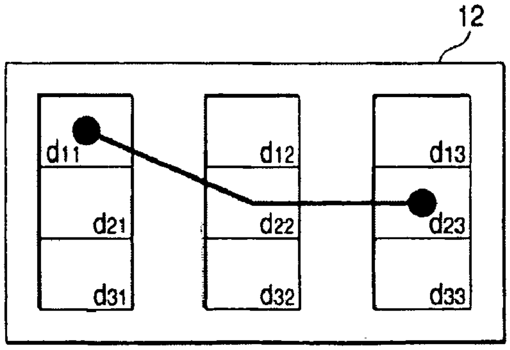

So long as these relative arrangements are set, a stationary display pattern represented by an arrangement relationship of $c_{11}$-$c_{23}$-$c_{31}$ shown in FIG. 6C is taken as occurrence of a win for the "Large V-shaped arrangement." Further, a stationary display pattern represented by an arrangement relationship which is shown in FIG. 6D and consists of $d_{11}$ and $d_{23}$ is taken as occurrence of a win for the "knightly arrangement." Occurrence of a win is not determined by fixed locations where indicias are to be displayed among a plurality of areas. Instead, occurrence of a win is determined so long as a relative arrangement is established at any location in a plurality of areas. As a result, a problem of a related-art gaming machine which takes absolute arrangements in a plurality of areas as basic requirements; that is, complexity encountered by the player when ascertaining occurrence of a win along BET line, can be eliminated.

Figure 7A:
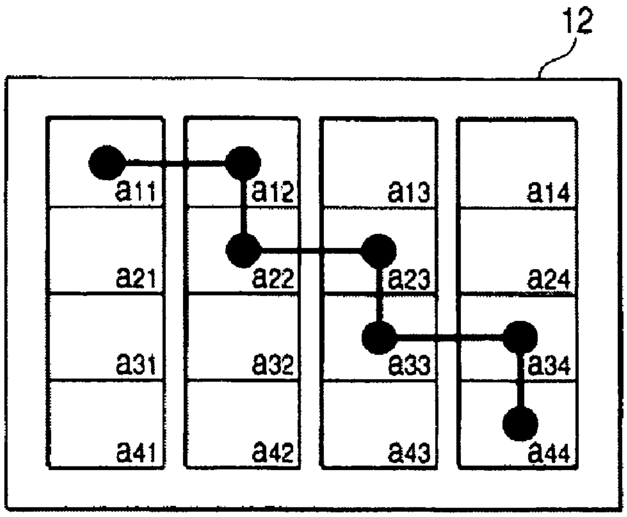
FIGS. 7A and 7B is are diagrams showing another modes of stationary display of indicias.
Figure 7B:
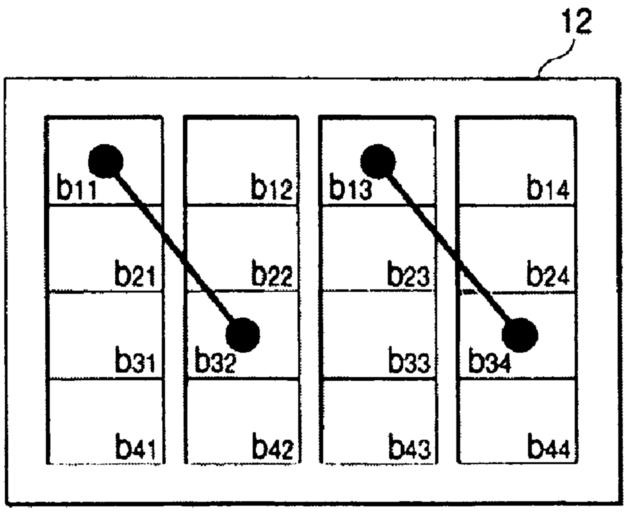

Such a relative arrangement includes a geometrical pattern constituting a regular arrangement of indicias. As shown in FIG. 7A, when a single indicia "●" is stationarily displayed in the areas "$a_{11}$,"$a_{12}$," "$a_{22}$," "$a_{23}$," "$a_{33}$," "$a_{34}$," and "$a_{44}$," occurrence of a win can be determined by a relative, regular arrangement; that is, "$a_{11}$-$a_{12}$-$a_{22}$," "$a_{22}$-$a_{23}$-$a_{33}$," or "$a_{33}$-$a_{34}$-$a_{44}$." As shown in FIG. 7B, when the single indicia "●" is stationarily displayed in the areas "$b_{11}$," "$b_{32}$," "$b_{13}$," and "$b_{34}$," a winning pattern can be set by a relative, regular arrangement perceived to be an "knightly arrangement," such as "$b_{11}$-$b_{32}$," and "$b_{13}$-$b_{34}$." In the case shown in FIG. 7B, an "knightly arrangement" consisting of "$b_{32}$-$b_{13}$" is also possible, whereby one zigzag line, that is, "$b_{11}$-$b_{32}$-$b_{13}$-$b_{34}$" can be formed. In order to provide the player with a more advantageous state by determining the number of winning lines, arrangements "$a_{11}$-$a_{32}$" and "$a_{13}$-$a_{34}$," which constitute two lines, can be preferably set as winning patterns.

In relation to such a relative positional relationship, consideration does not need to be given to all rows in a plurality of areas; consideration is given to at least one row capable of constituting a relative positional relationship. In connection with indicias remaining in a relative positional relationship, no limitation is imposed on the number of indicias. The only requirement is that predetermined indicias simply have a predetermined relative positional relationship.

Particularly, a win arises in the case of a pattern in which indicias are linked in the direction of a row, the direction of a column, and/or a diagonal direction. Thus, when indicias assuming a predetermined symbol relationship are relatively linked together, a win arises, thereby providing the player with a state which can become advantageous to the player. In such a case, the player can intuitively ascertain that the indicias are adjacent to each other. A gaming machine provides occurrence of a win which is readily comprehensible to a beginner or casual player. One example of "relative positional relationship" is a pattern in which indicias are arranged so as to be connected together (adjacent to each other) in the direction of a row, the direction of a column, and/or the diagonal direction. More specifically, the indicias are arranged adjacent to each other in a longitudinal, horizontal, upwardly-sloping, and downwardly-sloping direction. Within the plurality of areas arranged in a matrix pattern, areas do not become adjacent to each other while jumping a certain area.

In relation to the indicias remaining in a predetermined symbol relationship, "patterns which are linked together" will be described by reference to FIGS. 8A through 8D. For example, predetermined single ID information "●" is displayed in areas "$a_{11}$," "$a_{22}$," and "$a_{13}$," thereby constituting a linked pattern consisting of three areas "$a_{11}$-$a_{22}$-$a_{13}$" (see FIG. 8A). Similarly, the predetermined single ID information "●" is displayed in areas "$b_{12}$," "$b_{21}$," "$b_{23}$," and "$b_{34}$," thereby constituting a linked pattern consisting of four areas "$b_{21}$-$b_{12}$-$b_{23}$-$b_{34}$" (see FIG. 8B). The predetermined single ID information "●" is displayed in areas "$c_{11}$," "$c_{12}$," "$c_{32}$," "$c_{33}$," and "$c_{24}$," thereby constituting a linked pattern of two areas "$c_{11}$-$c_{12}$" and a linked pattern consisting of three areas "$c_{32}$-$c_{33}$-$c_{24}$" (see FIG. 8C).

Figure 8A:
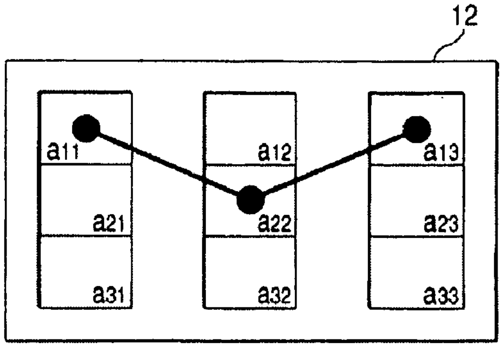
FIGS. 8A to 8D are diagrams showing another modes of stationary display of indicias.
Figure 8B:
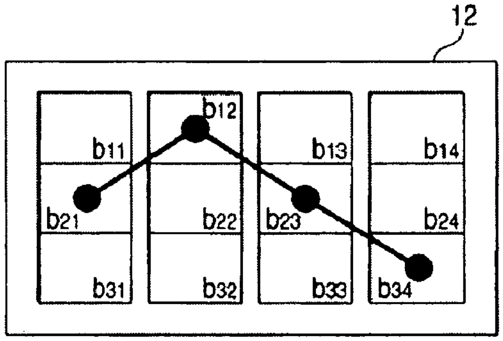
Figure 8C:
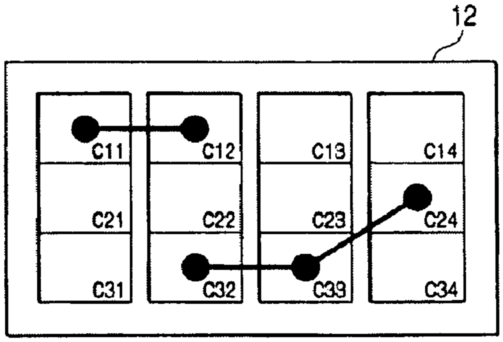
Figure 8D:
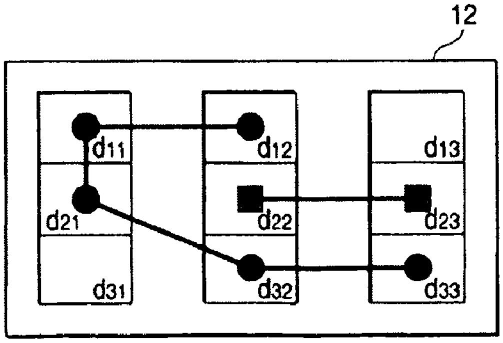

In FIG. 8D, a single indicia is stationarily displayed in the direction of a column in the plurality of areas arranged in a matrix pattern; for example, when a single indicia "●" is displayed in areas "$d_{11}$," "$d_{12}$," "$d_{21}$," "$d_{32}$," and "$d_{33}$," thereby constituting a linked pattern of five areas "$d_{12}$-$d_{11}$-$d_{21}$-$d_{32}$-$d_{33}$." In this case, "■" differing from "●" is displayed in the areas "$d_{22}$" and "$d_{23}$," thereby constituting a two linked pattern of "$d_{22}$-$d_{23}$." Consequently, a linked pattern consisting of five indicias "●" and a linked pattern consisting of two identification items "■" are simultaneously established as winning patterns.

As shown in FIG. 8D, when one linked pattern consisting of five "●" and another linked pattern consisting of two "●" have been established, a distinction can be made in relation to occurrence of a win, according to whether the indicias are "●" or "■." However, the complexity involved in determining a winning pattern or rendering a determination can be obviated by setting the number of independent lines formed when indicias remaining in a predetermined symbol relationship are linked together, regardless of the indicias.

In this way, if the "predetermined symbol relationship" corresponds to a single indicias and if the "relative positional relationship" corresponds to a mutually-linked (adjoining) relationship, the player grasps simply-linked (adjacent) single ID information. Hence, the player can intuitively grasp, within a short period of time, whether or not a win has arisen.

Alternatively, in relation to a relative positional relationship, there may be configured that a win arises only in the case of occurrence of a pattern in which single indicias are linked in only the direction of a row and/or a diagonal direction. More specifically, even when the indicias remaining in a predetermined symbol relationship (e.g., single indicias) are linked in the direction of a column, the linked pattern is excluded from the winning patterns.

Figure 9A:
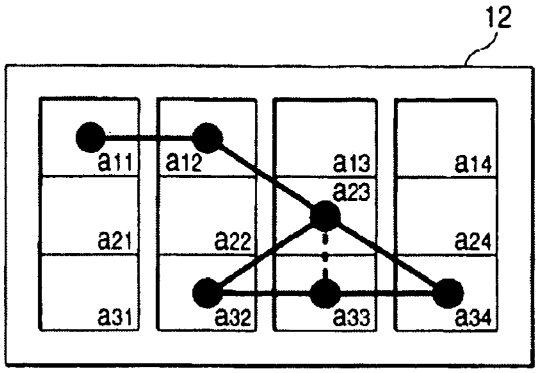
FIGS. 9A to 9C are diagrams showing another modes of stationary display of indicias displayed.

For example, as shown in FIG. 9A, the single indicia "●" is displayed in the areas "$a_{11}$," "$a_{12}$," "$a_{23}$," "$a_{32}$," "$a_{33}$," and "$a_{34}$." In a case where six indicias "●" are stationarily displayed in a linked manner, a winning pattern consisting of four areas "$a_{11}$-$a_{12}$-$a_{23}$-$a_{34}$," a winning pattern consisting of three areas "$a_{32}$-$a_{23}$-$a_{34}$," and a winning pattern consisting of three areas "$a_{32}$-$a_{33}$-$a_{34}$" are established simultaneously and separately. Therefore, a pattern consisting of areas "$a_{23}$-$a_{33}$" which are adjacent to each other in the direction of a column (indicated by dashed lines shown in FIG. 9A) is excluded from objects which are to be set as winning patterns.

Figure 9B:
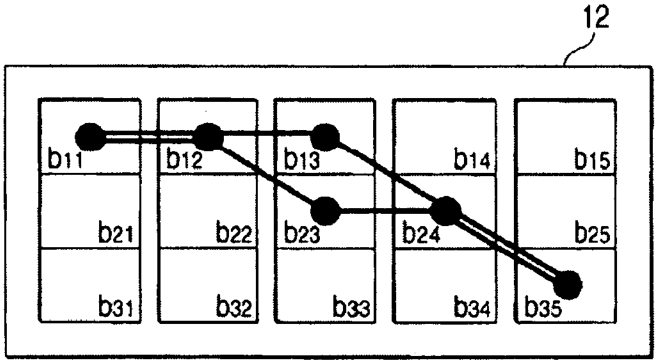

As shown in FIG. 9B, the single indicia "●" is displayed in the areas "$b_{11}$," "$b_{12}$," "$b_{13}$," "$b_{23}$," "$b_{24}$," and "$b_{35}$." In a case where six indicias "●" are stationarily displayed while remaining adjacent to each other, a winning pattern consisting of five areas "$b_{11}$-$b_{12}$-$b_{13}$-$b_{24}$-$b_{35}$" and a winning pattern consisting of five areas "$b_{11}$-$b_{12}$-$b_{23}$-$b_{24}$-$b_{35}$" are established simultaneously and separately. In other words, a pattern consisting of "$b_{12}$-$b_{22}$," which are adjacent to each other in the direction of a column, is included in the winning patterns. Consequently, a pattern consisting of six areas "$b'_{11}$-$b'_{12}$-$b'_{13}$-$b'_{23}$-$b'_{24}$-$b'_{25}$" (see FIG. 9B) does not constitute any winning pattern.

Figure 9C:
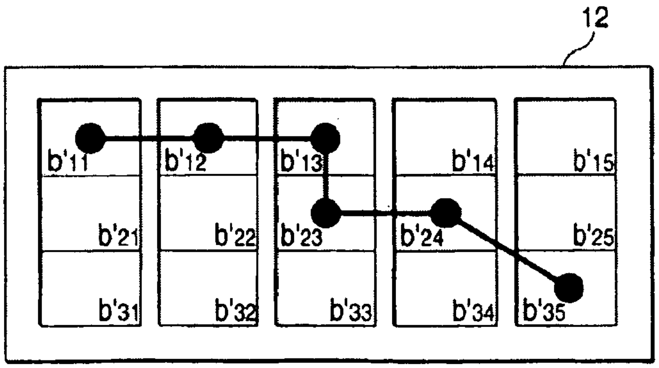

In this way, a way to set, as winning patterns, only patterns in which indicias are adjacent to each other in the direction of a row and in the diagonal direction is preferably adopted when there is established a rule which enables a shift to a state more advantageous to the player by taking two winning patterns, each consisting of five areas, such as that shown in FIG. 9B as objects of setting rather than taking one pattern consisting of six areas such as that shown in FIG. 9C as an object of setting, or when many identical indicias are adjacent to each other and constitute a complicated link pattern.

Still alternatively, in relation to a relative positional relationship, there may be configured that a win arises only in the case of occurrence of a pattern in which a linkage which does not reverse in the direction of a row. It is intended for eliminating complexity, which would otherwise arise in the direction in which indicias are linked when three or more identical indicias are adjacent to each other, unless the direction in which indicias are to be linked is uniquely defined.

As shown in FIG. 9A, under the assumption that the single indicias "●" is displayed in the areas "$a_{11}$," "$a_{12}$," "$a_{32}$," "$a_{23}$," "$a_{33}$," and "$a_{34}$," when six "●" are stationarily displayed in a connected manner, occurrence of a win is determined by the following four conceivable patterns.

(i) one linked pattern consisting of six areas "$a_{11}$-$a_{12}$-$a_{23}$-$a_{34}$-$a_{33}$-$a_{32}$-$a_{23}$" (or "$a_{11}$-$a_{12}$-$a_{23}$-$a_{32}$-$a_{33}$-$a_{34}$-$a_{23}$");

(ii) two linked patterns consisting of five areas each, "$a_{11}$-$a_{12}$-$a_{23}$-$a_{33}$-$a_{32}$" and "$a_{11}$-$a_{12}$-$a_{23}$-$a_{33}$-$a_{34}$";

(iii) two linked patterns consisting of four areas each, "$a_{11}$-$a_{12}$-$a_{23}$-$a_{34}$" and "$a_{11}$-$a_{12}$-$a_{23}$-$a_{32}$," two linked patterns consisting of three areas each, "$a_{32}$-$a_{23}$-$a_{34}$" and "$a_{23}$-$a_{33}$-$a_{34}$," and two linked patterns consisting of two areas each, "$a_{32}$-$a_{23}$" and "$a_{23}$-$a_{33}$"; and (iv) one linked pattern consisting of four areas "$a_{11}$-$a_{12}$-$a_{23}$-$a_{34}$" and two linked patterns consisting of three areas each, "$a_{32}$-$a_{23}$-$a_{34}$" and "$a_{32}$-$a_{33}$-$a_{34}$."

Settings and determination may be performed such that these patterns are established simultaneously. In view of the requirement "a linkage which does not reverse to the other end in the direction of a row," the following are excluded from the winning patterns: the pattern (i) which involves the reversion "$a_{34}$-$a_{33}$-$a_{32}$" ("$a_{23}$-$a_{32}$"), the first of the patterns (ii), which involves the reversion "$a_{33}$-$a_{32}$," and the pattern (iii) "$a_{11}$-$a_{12}$-$a_{23}$-$a_{32}$." Further, if the above described requirement "the indicia located at one end with respect to the direction of a row is taken as a start point" is applied to this example, the pattern (iii) that takes the ID information located at "$a_{32}$" as a start point is excluded from the winning patterns, and the winning pattern shown in FIG. 9A is defined uniquely as the pattern (iv).

Thus, there has been described the win determination method, wherein the patterns defining the symbol relationship and those defining the relative position relationship have been prepared in advance and wherein occurrence of a win is determined by determining occurrence of a match between the patterns. There will now be described win determination processing which is performed by converting the stationary display pattern of the ID information into numerical information and by applying the numerical information to a predetermined arithmetic expression.

Figure 10:
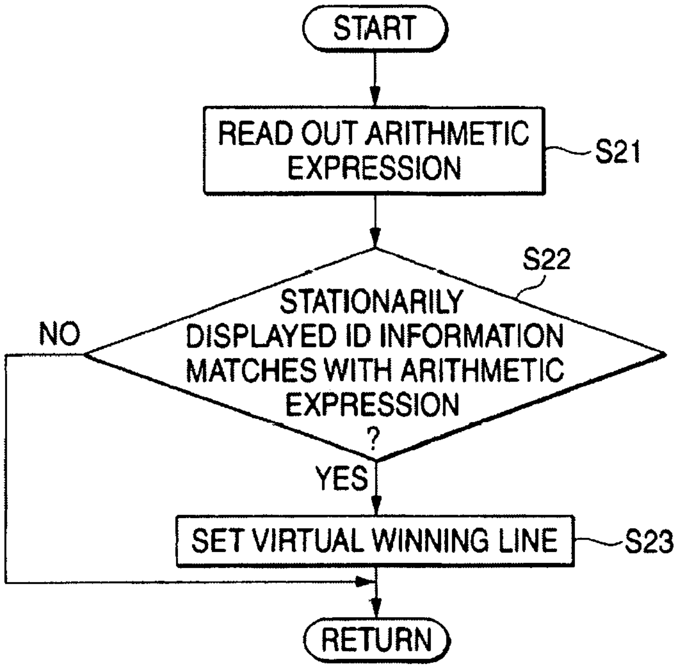
FIG. 10 is a flowchart showing a win determination processing routine for the gaming machine.

First, an arithmetic expression to be used for determining a win is loaded (step S21) by reference to FIG. 10. The expression is determined so as to correspond to a win determination rule. Information about a predetermined arithmetic expression is selected from the data previously stored in the ROM 101$b_1$, and the thus-selected information is transmitted to the RAM 100$b_2$.

Next, a determination is made as to whether or not a match exists between the stationarily-displayed ID information and the predetermined arithmetic expression (step S22). For example, indicias are binarized so as to correspond to respective indicias of different types. The binarized information is applied to the arithmetic expression, thereby determining whether or not the information items coincide with the expression. Thus, a determination can be made by use of a so-called comparator or the like.

Here, when the stationarily-displayed indicias and the predetermined arithmetic expression are determined to coincide with each other, a virtual line which virtually connects together a plurality of display areas can also be set among the indicias that have satisfied the predetermined arithmetic expression (i.e., indicias which constitute a predetermined relative positional relationship and a predetermined symbol relationship, and adjacent indicias) (step S23). Specifically, in order to inform the player that a winning line has been set as a result of occurrence of a win, a slot machine which blinks/illuminates a winning line lamp (not shown) provided between a plurality of display areas of the display 12 enables control of a corresponding winning line lamp on the basis of the information about setting of the virtual line.

In this way, a determination is made as to whether or not a "win" or "failure" has arisen in the game, by determination operation pertaining to step S22, whereby the sub-routine is completed.

A specific way to determine occurrence of a win to be performed by the win determinant 100$a_4$ will be described below.

Figure 11:
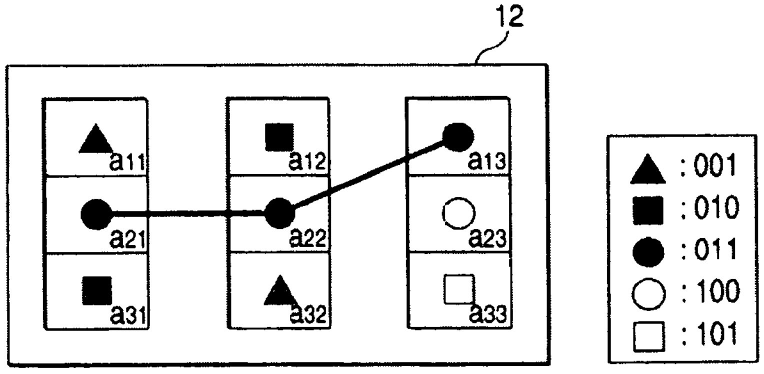
FIG. 11 is a diagram showing one example of the stationary display of indicias.

Each of the indicias to be displayed in the areas has unique code information. For example, an indicias is specified in the controller through, e.g., binarization. Specifically, as shown in FIG. 11, ID information "▲" specifies "001"; ID information "■" specifies "010"; ID information "●" specifies "011"; ID information "○" specifies "100"; and ID information "□" specifies "101."

In a case where occurrence of a win is determined when the same indicias are adjacent to each other in connection with a plurality of indicias stationarily displayed on the display 12, the following determination is made for the binarized ID information codes associated with the respective indicias. Under the assumption that binarized data pertaining to the ID information $a_{xy}$ are taken as D(x, y), a determination is made as to whether or not there is D which induces D(x, y)=D(x±1, y±1), D(x, y±1), or D(x±1, y), over the entire regions. Occurrence of a win is determined by existence or absence of linked ID information.

For example, in relation to the stationary display pattern of the indicias shown in FIG. 11, a binarized ID information code is written into the RAM 100$b_2$ so as to correspond to each indicia; D(1, 1)=[001] is written because the ID information "▲" is displayed in the area "$a_{11}$"; D(1, 2)=[010] is written because the ID information "■" is displayed in the area "$a_{12}$"; D(1, 3)=[011] is written because the ID information "●" is displayed in the area "$a_{13}$"; D(2, 1)=[011] is written because the ID information "●" is displayed in the area "$a_{21}$"; D(2, 2)=[011] is written because the ID information "●" is displayed in the area "$a_{22}$"; D(2, 3)=[100] is written because the ID information "○" is displayed in the area "$a_{23}$"; D(3, 1)=[010] is written because the ID information "■" is displayed in the area "$a_{31}$"; D(3, 2)=[001] is written because the ID information "▲" is displayed in the area "$a_{32}$"; and D(3, 3)=[101] is written because the ID information "□" is displayed in the area "$a_{33}$."

There is performed a comparison among the binarized information associated with the ID information stationarily displayed in the area "$a_{11}$"; the binarized information associated with the ID information stationarily displayed in the area "$a_{12}$" which is adjacent to the area "$a_{11}$" in the direction of a row; the binarized information associated with the ID information stationarily displayed in the area "$a_{21}$" which is adjacent to the area "$a_{11}$" in the direction of a column; and the binarized information associated with the ID information stationarily displayed in the area "$a_{22}$" which is adjacent to the area "$a_{11}$" in the diagonal direction. The comparison is expressed as D(1, 1)=[001], D(1, 2)=[010], D(2, 1)=[011], and D(2, 2)=[011]. Thus, the binarized information items are different from each other. Therefore, the ID information stationarily displayed in the area "$a_{11}$" is determined not to constitute an adjacent predetermined symbol relationship.

In this way, the indicias stationarily displayed in the respective areas are compared with the indicias stationarily displayed in the areas which are adjacent to the areas in the direction of a row, the direction of a column, and the diagonal direction. In the case of the pattern shown in FIG. 11 into which the indicias are stationarily displayed, the indicia stationarily displayed in the area "$a_{21}$" specifications D(2, 1)=[011], and the indicia stationarily displayed in the area "$a_{22}$" specifies D(2, 2)=[011]. Therefore, D(2, 1)=D(2, 2). The predetermined arithmetic expression D(x, y)=D(x, y±1) is satisfied. Hence, the indicias are determined to be in a predetermined symbol relationship; that is, they are adjacent to each other in the direction of a row.

Similarly, the indicia stationarily displayed in the area "$a_{13}$" specifications D(1, 3)=[011], and the indicias stationarily displayed in the area "$a_{22}$" specifies D(2, 2)=[011]. Therefore, D(1, 3)=D(2, 2). The predetermined arithmetic expression D(x, y)=D(x±1, y±1) is satisfied. Hence, the indicias are determined to be in a predetermined symbol relationship; that is, they are adjacent to each other in the direction of a row. Consequently, D(2, 1)=D(2, 2)=D(1, 3). Hence, the indicias appearing in the areas "$a_{21}$," "$a_{22}$," and "$a_{13}$" are determined to constitute a pattern of the predetermined symbol relationship and to have caused a win to arise. Hence, a predetermined gamine value is offered.

In the win determination operation which is performed with exception of an adjacent relationship across the plurality of areas arranged in a matrix pattern, the relationship extending in the direction of a column, the indicias satisfying D(x, y)=D(x±1, y) are excluded from the indicias satisfying the arithmetic expressions.

In a case where there is included a linkage of indicias in a direction which is not reverse in the direction of a row, the value of "y" indicating elements arranged in the direction of a column is decreased. Namely, the arithmetic expression involving "y−1" as a component is eliminated.

In this way, the gaming machine performs the win determination operation by combination of various arithmetic expressions.

Figure 12A:
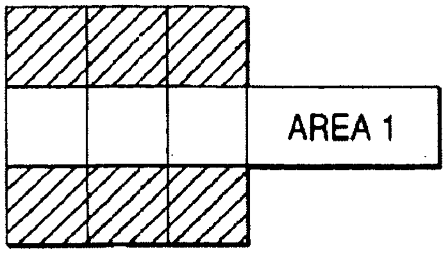
FIGS. 12A to 12C are diagrams explaining a BET range for the gaming machine.
Figure 12B:
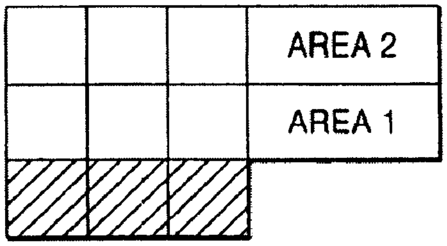
Figure 12C:
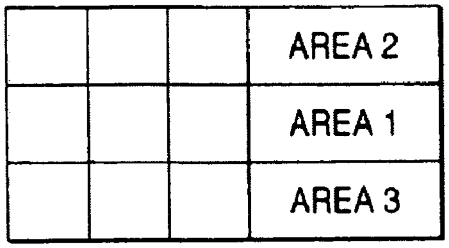
Figure 13:
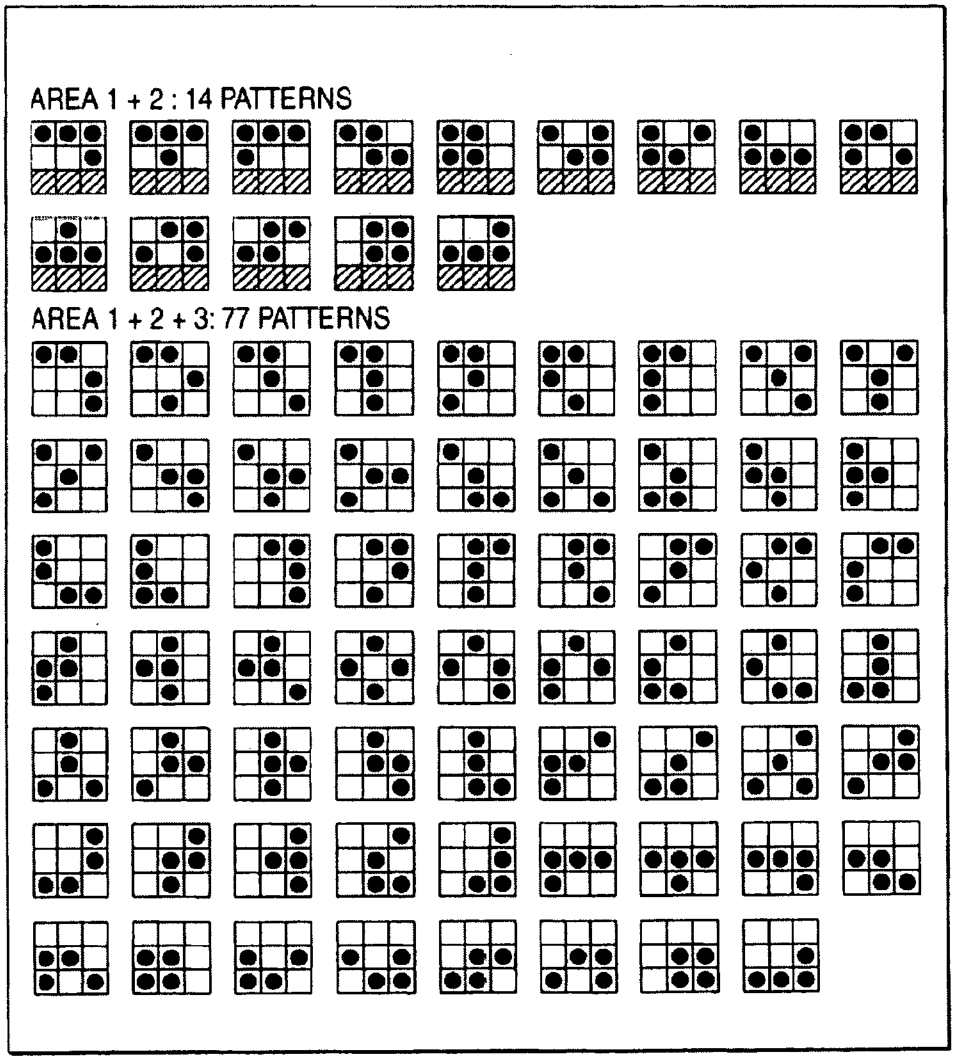
FIG. 13 is a diagram showing available winning patterns according to the BET range.

FIGS. 12A through 13 are views for describing a relationship between a BET range and win patterns to be used for determination of occurrence of a win.

In a slot machine having a 3-by-3 array of areas, the areas are partitioned in the direction of a row. An upper row is set as AREA 2; a center row is set as AREA 1; and a lower row is set as AREA 3 (see FIG. 12C).

The player arbitrarily selects a BET range from among the three rows and determines the number of tokens (or credits) to be bet on one game. The BET range is selected by a button provided on the control panel 14. The number of tokens (credits) to be bet in the thus-selected BET range is selected by use of another button on the control panel 14. In this way, the number of credits to be bet on one game is a value determined by multiplying the BET range by the number of tokens (or credits). A predetermined gaming value corresponding to the number of credits is provided to the player.

FIG. 12A shows a case where only AREA1 has been selected as the BET range; FIG. 12B shows a case where AREA1+AREA2 have been selected; and FIG. 12C shows a case where AREA1+AREA2+AREA3 have been selected.

FIG. 13 shows example patterns in which four indicias are linked together as a predetermined symbol relationship. When two areas are selected as the BET range as shown in FIG. 12B, 14 patters can be available. When three areas are selected as the BET range as shown in FIG. 12C, 77 patterns can be available.

In such a slot machine of the embodiment, occurrence of a win is determined on the basis of various patterns. A shift arises to a state which is advantageous to the player.

However, even when the player has not ascertained all these patterns beforehand, a win arises so long as there is satisfied a simple condition that indicias are stationarily displayed adjacent to each other. Therefore, the player can visually and intuitively ascertain determination of a win.

The above description is based on the premise that indicias are displayed in the form of a video on a CRT or the like. However, the invention is not limited to the video display. The indicias may be displayed through use of mechanical reels. In this case, the indicias on the respective reels are determined by a position sensor provided in the gaming machine. A determination is made as to whether or not indicias constituting a predetermined symbol relationship assume a pattern of a predetermined relative positional relationship (e.g., an adjacent relationship).

What is claimed is:

1. A gaming machine, comprising;

a display, including a plurality of matrix areas, each operable to display one of plural indicia, each of the plural indicia including an ID information for determining whether displayed contents of the indicia are the same or for determining a predetermined relative positional relationship, in which correlation is intuitively recognized, exist:

a first controller, which performs a lottery operation for determining stationarily-displayed indicia, the first controller performing the lottery operation without having a predetermined winning pattern designated by a player before the lottery operation;

a second controller for determining whether ID information of each of the stationarily displayed indicia matches an arithmetic expression for determining a win occurrence when the first controller stations the indicia; and a third controller, which determines an occurrence of a win when the second controller determines that the ID information of each of the stationarily displayed indicia matches the arithmetic expression;

wherein a win determination is performed for the stationarily displayed indicia within a BET range selected by a player in the plurality of matrix areas on the display.

2. The gaming machine as set forth in claim 1, wherein a pattern is formed when the predetermined indicia are adjacently arranged in at least one of a row direction and a diagonal direction in the matrix areas.

3. The gaming machine set forth in claim 2, wherein each of at least three columns in the matrix area contains only one of the predetermined indicia when three or more predetermined indicia are adjacently arranged.

4. The gaming machine as set forth in claim 1, wherein the third controller determines a number of win only considering a number of the relative positional relationship formed in the BET range.

5. The gaming machine as set forth in claim 1, wherein the indicia includes an indicium substituting any other indicia.

6. A method of controlling a gaming machine, comprising steps of:

providing a plurality of matrix areas in a display such that each of the areas is operable to display one of plural indicia, each of the plural indicia including an ID information for determining whether displayed contents of the indicia are the same or for determining a predetermined relative positional relationship, in which correlation is intuitively recognized exist;

performing a lottery operation a lottery operation for determining stationarily-displayed indicia, the lottery operation being performed without having a predetermined winning pattern designated by a player before the lottery operation;

determining whether ID information of each of the stationarily displayed indicia matches an arithmetic expression for determining a win occurrence when the indicia stations; and determining an occurrence of a win when the ID information of each of the stationarily displayed indicia matches the arithmetic expression, wherein a win determination is performed for the stationarily displayed indicia within a BET range selected by a player in the plurality of matrix areas on the display.

7. The control method as set forth in claim 6, wherein a pattern is formed when the predetermined indicia are adjacently arranged in at least one of a row direction and a diagonal direction in the matrix areas.

8. The control method as set forth in claim 7, wherein each of at least three columns in the matrix area contains only one of the predetermined indicia when three or more predetermined indicia are adjacently arranged.

9. The control method as set forth in claim 6, further comprising the step of: determining the number of win only considering the number of the patterns formed in the matrix areas.

10. The control method as set forth in claim 6, wherein the indicia includes an indicium substituting any other indicia.

11. The gaming machine as set forth in claim 1, wherein said predetermined patterns are in the form of a closed polygon.

12. The gaming machine as set forth in claim 1, wherein said predetermined patterns are determined on the basis of at least one arithmetic algorithm.

13. The gamine machine as set forth in claim 1, wherein a win is determined only considering the number of predetermined patterns formed in the matrix areas.

14. The control method as set forth in claim 6, wherein a predetermined pattern is in the form of a closed polygon.

15. The control method as set forth in claim 6, wherein said predetermined patterns are determined on the basis of at least one arithmetic algorithm.

16. The gaming machine as set forth in claim 6, wherein a win is determined only considering the number of predetermined patterns formed in the matrix areas.

17. A gaming machine, comprising:

a display, including a plurality of matrix areas, each operable to display one of plural indicia each of the plural indicia including an ID information for determining whether displayed contents of the indicia are the same or for determining a predetermined relative positional relationship, in which correlation is intuitively recognized, exist;

a first controller, which performs a lottery operation for determining stationarily-displayed indicia, the first controller performing the lottery operation without having a predetermined winning pattern designated by a player before the lottery operation is performed;

a second controller for determining whether ID information of each of the stationarily displayed indicia, which are adjacently arranged in a row direction, a column direction and a diagonal direction, matches an arithmetic expression for determining a win occurrence when the first controller stations the indicia; and a third controller, which determines an occurrence of a win when the second controller determines that the ID information of each of the stationarily displayed indicia matches the arithmetic expression wherein a win determination is performed for the stationarily displayed indicia within a BET range selected by a player in the plurality of matrix areas on the display.

18. The control method as set forth in claim 17, wherein a pattern is formed when the predetermined indicia are adjacently arranged in at least one of a row direction and a diagonal direction in the matrix areas.

19. The gaming machine as set forth in claim 1, wherein a credit, which can be bet on one game is determined based on a value calculated by multiplying a number of the BET range selected by the player to a number of tokens or credits bet to one BET range.

* * * * *